J. L. STRATTON & F. MURDOCK.
DISINFECTING APPARATUS.
No. 11,418. Reissued May 1, 1894.
Fig. 1.
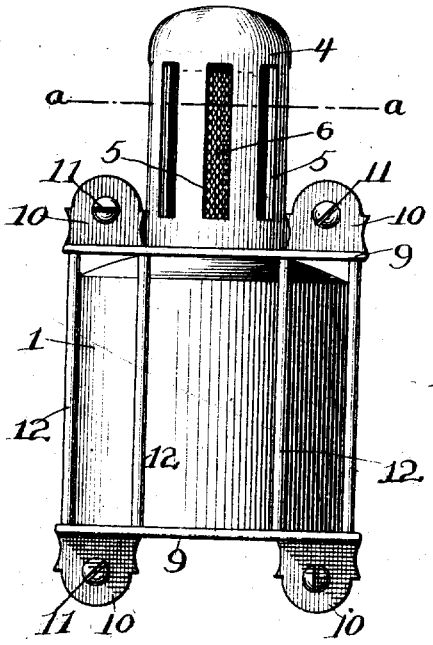
Fig. 2.
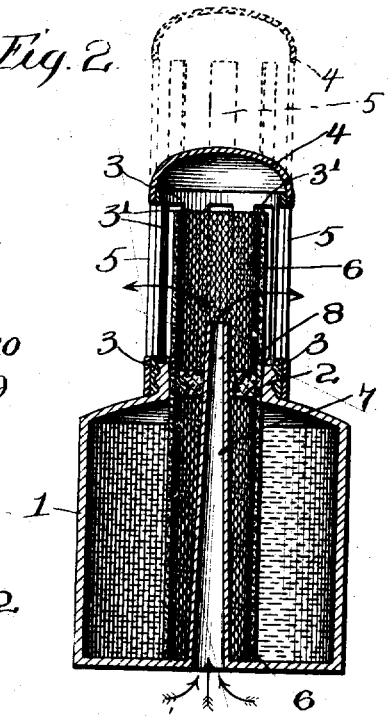
Fig. 4
Fig. 3.
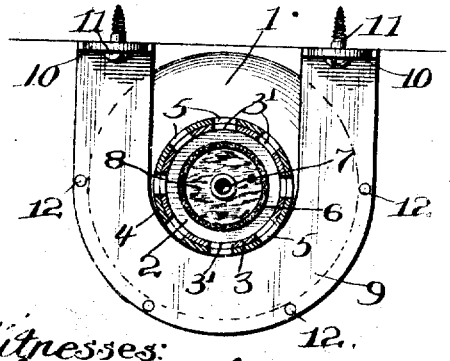
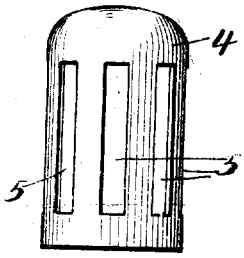
Fig. 5.
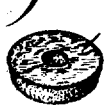
Witnesses:
Charles O. Sherey.
A. J. H. Ebbesen
Inventors,
James L. Stratton &
Frank Murdock
by
Wilkinson & Bitner Attys.

UNITED STATES PATENT OFFICE.

JAIRUS L. STRATTON, OF CHICAGO, ILLINOIS, AND FRANK MURDOCK, OF KANSAS CITY, KANSAS.

DISINFECTING APPARATUS.

SPECIFICATION forming part of Reissued Letters Patent No. 11,418, dated May 1, 1894.

Original No. 510,825, dated December 12, 1893. Application for reissue filed January 30, 1894. Serial No. 498,527.

*To all whom it may concern:*

Be it known that we, JAIRUS L. STRATTON, formerly of Kansas City, Kansas, now residing at Chicago, Illinois, and FRANK MURDOCK, of Kansas City, Kansas, have invented certain new and useful Improvements in Disinfecting Apparatus; and we do hereby declare the following to be a full, clear, and exact description of the said improvements.

Our invention relates to a disinfecting apparatus in which a wick, from its porous nature, draws up a disinfecting fluid by capillary attraction, in such quantities as to be easily evaporated; and our object is to provide and construct such an apparatus which may be so regulated that the evaporation may be increased or decreased at will, preferably by means of an adjustable cap having a series of elongated perforations through which the vapors escape, and to so construct the same that it will be efficient, simple and durable, and with these objects in view, our invention consists of its several parts hereinafter specified and fully illustrated in the accompanying drawings, in which—

Figure 1, represents a front view of the apparatus secured in place ready for use. Fig. 2, is a central vertical section through same, showing more clearly the wick and air-tube. Fig. 3, is a sectional plan view of same, taken on line *a*, *a*, of Fig. 1. Fig. 4, is a detail view of the perforated cap, by which the evaporation is regulated; and Fig. 5 is a detail view in perspective of the cork or rubber stopper, which fits around the air-tube, inside the wick.

Referring to the drawings by numbers—1, represents the fluid receptacle or tank, constructed of glass or other suitable material and provided with a neck 2, which is threaded to receive the metallic tube 3, which is also threaded so as to fit securely on said neck. This tube 3, is provided with a series of elongated openings 3′, which extends from its base, where it is threaded on the neck 2, to within a short distance of its top, as seen in Fig. 2.

4, represents a metallic cap, which fits snugly over the tube 3, as shown in Figs. 2 and 3; and this cap is provided with a series of elongated openings 5, which register with the openings 3′, in said tube 3; so that the openings may be left entirely open or partially or wholly closed, as may be desired.

6, represents a wick formed of any suitable porous material, such as is generally used in lamps, &c. The lower portion of said wick is submerged in the disinfecting fluid, and the upper portion extends up through the neck of the fluid receptacle, nearly to the top of the tube 3, so that the fluid or fluids, which are absorbed by said wick, arise by capillary attraction, and are vaporized and carried off into the atmosphere, by means of the air which circulates through the openings, 3′, and 5.

To facilitate the evaporation, we construct an air-tube 7, to extend up through the center of wick 6, as illustrated in Fig. 2, which creates a continuous circulation of air as indicated by arrow points, in Fig. 2.

8, represents a stopper made of cork, rubber, or other suitable material which fits inside the wick, around said air-tube, 7, and serves to hold said wick, in place, and prevents the air from penetrating to the fluid chamber or receptacle, so that there is no evaporation, except from the wick. Thus all the ingredients which are contained in said fluid, are vaporized in equal proportions. Said cork also serves as an additional or auxiliary means of regulating the rapidity of the vaporization of the liquid as it may be crowded more tightly into the opening to compress the wick between it and the opposing walls and thus decrease the possible flow of liquid upward through the wick. If found desirable a light wire form may be constructed to fit in the upper portion of the wick, to hold it in position.

The fluid receptacle may be incased in a frame or holder, formed of two metallic plates 9, 9, having flanges 10, through which suitable screws 11, may pass to secure the apparatus to the wall, or to any convenient place; and these plates 9, 9, are connected by three or more small rods or stays 12, 12, as clearly illustrated in Figs. 1 and 3.

The cap 4, is made to fit snugly over the tube 3, and as before stated, the openings 3′, and 5, may be partially or wholly closed by turning said cap to the right or left, and when greater evaporation is desired, the cap may be raised to any requisite height, as illustrated by dotted lines in Fig. 2. Said cap and tube may be made of metal, and finished in any style desired, such as nickel-plated, brass, or aluminum.

In our apparatus the evaporation is kept up by a continuous current of air, and the wick extending through the entire body of fluid, absorbs an equal percentage of each of the several ingredients used in the manufacture of such fluid; thereby making it possible to secure the same quality of vapor from a partially filled receptacle, as would be secured from a filled receptacle.

This apparatus is designed for use in such places as public and private toilet rooms, where disagreeable odors are to be counteracted; in schools where the impurities of air are to be acted upon; and in the sick room to counteract disagreeable odors and to prevent the contagion of diseases.

It is obvious that any suitable fluid may be used, and that the apparatus be constructed of any convenient size, and of such design as may be deemed practicable.

Having now fully described our invention, what we claim as new, and desire to secure by Letters Patent, is—

1. A disinfecting apparatus, having a fluid receptacle to which is secured a suitable metallic tube provided with a series of elongated openings, and covered by a cap having similar openings, adapted to register with the openings in the tube through which the vaporized fluids pass off, substantially as described.

2. A disinfecting apparatus, having a fluid receptacle and provided with a tube and cap, each having a series of elongated openings adapted to register, and a wick to extend into said receptacle and to project up into said tube for absorbing and evaporating the fluids, substantially as described.

3. A disinfecting apparatus having a fluid receptacle with an air-tube extending through the same, said receptacle provided with an upwardly extended tube having a series of elongated openings; and a cap fitting over said tube and having similar openings adapted to register with the openings in said tube, the bars between said openings being wide enough to cover the openings in said tube, thus enabling the flow of the fluid to be regulated by turning the said cap, substantially as described.

4. A disinfecting apparatus having a fluid receptacle with an air-tube extending through the same, said receptacle provided with an upwardly extended tube having elongated openings, a wick extending through said receptacle to near the top of the tube; a stopper fitting inside of the wick and around the air tube; and a cap fitting over said tube having elongated openings adapted to register with the openings in said tube; the bars between said openings being wide enough to cover the openings in said tube, thus enabling the flow of the liquid to be regulated by turning the said cap, substantially as described.

5. In an apparatus of the class described, the combination with a suitable receptacle for the liquid having an opening in its walls, a wick passing through said opening and a cork fitted within the opening and adapted to bear against the wick; substantially as described.

6. In an apparatus of the class described, the combination with a suitable receptacle having an opening of variable size to the atmosphere and an inner chamber connected with the outer by a small opening or passage, a wick partly within said inner chamber and extending through the small opening into the outer chamber, and a cork fitted to said small opening adapted to both cut off communication between the liquid and the atmosphere except through the wick, and to also compress said wick to limit the passage of the liquid therethrough; substantially as described.

JAIRUS L. STRATTON.
FRANK MURDOCK.

Witnesses to the signature of J. L. Stratton:
CHARLES O. SHERVEY,
A. I. H. EBBESEN.

Witnesses to the signature of Frank Murdock:
EMIL JOHNSON,
ISSY LANDA.